UNITED STATES PATENT OFFICE.

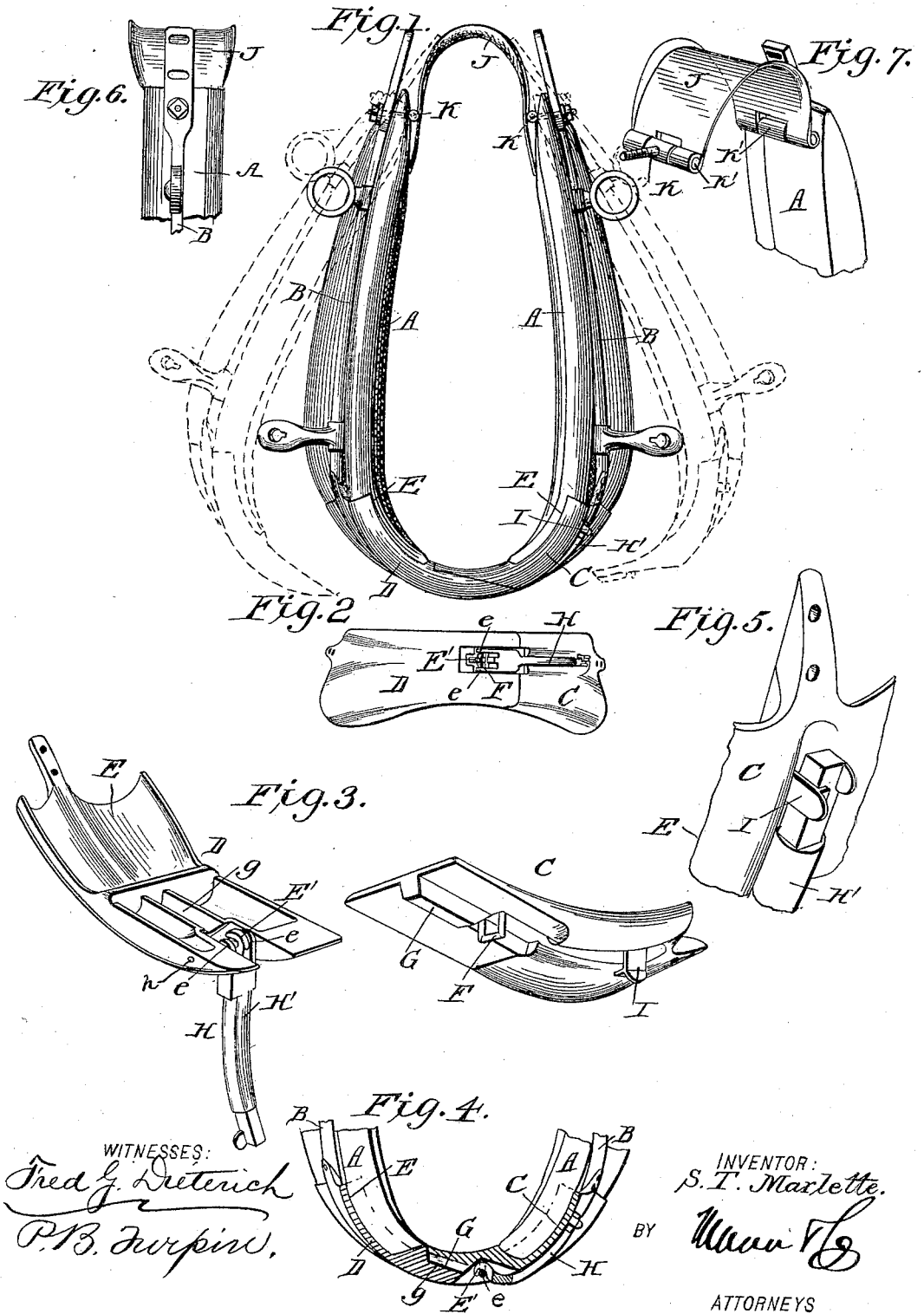

SILAS T. MARLETTE, OF NIAGARA FALLS, NEW YORK.

HORSE-COLLAR.

SPECIFICATION forming part of Letters Patent No. 449,488, dated March 31, 1891.

Application filed May 3, 1890. Serial No. 350,544. (No model.)

*To all whom it may concern:*

Be it known that I, SILAS T. MARLETTE, of Niagara Falls, in the county of Niagara and State of New York, have invented a new and useful Improvement in Horse-Collars, of which the following is a specification.

This invention is an improvement in horse-collars; and it consists in certain novel constructions and combinations of part, as will be hereinafter described, and pointed out in the claims.

In the drawings, Figure 1 is a front view of the improved device. Fig. 2 is a detail view of a part of the lower end of the same, and Figs. 3, 4, 5, 6, and 7 are detail views.

The side pieces or sections A of the collar may be of the usual cross-sectional form and may be padded in any suitable manner. The hames B B are fitted to the sides A A, and may be secured thereto by riveting or in other suitable manner. Where necessary, the hames may be inside the side pieces. In the construction shown the collar is arranged to open at the bottom; but manifestly it may be arranged to open at the top, in which event the fastening devices or connection-pieces may preferably be made much lighter. The connection-pieces C D are connected with the sides A, and preferably are formed with or rigidly secured to the hames at the ends thereof. In the construction shown and as preferred the connection-pieces C D are formed with sockets or seats at E to receive the ends of the sides A, which fit and are secured therein, as shown. The connection-pieces C and D are lapped together and secured by means of the fastening devices, which comprise the hook E', supported on the piece D and arranged to engage a bearing F on the piece C. I also provide the piece D with a socket $g$, which receives a projection G on the piece C, such construction G and $g$ serving to brace the parts C and D from independent movement to the front or back. The bearing F is preferably a staple arranged just in rear of the projection G. The hook E' is a part of the fastening-bar H, which bar is pivoted at $h$ and has the hook E' on one side of its pivot and a handle-arm H' on the other side, said handle-arm being arranged to engage and be secured by a spring-catch I on the connection-piece C when the parts are in fastened position. On opposite sides of the hook E', I provide side lugs $e$, through which the pivot-pin passes. It will be noticed that even if the handle H' should get free from catch I the collar cannot draw apart. At the end of the collar, opposite the connection-pieces C D, I provide the cap J, which extends between and is hinged at its ends to the ends of the collar sides. In the construction shown and as is preferred I employ bolts K, hinged at their inner ends at K' to the ends of the cap J, and extended thence out through the side pieces A and the hames and secured by nuts, as shown, or in other suitable manner.

By making the hames with a number of slots at their upper ends for the passage of the bolts K the said bolts may be adjusted to make the collar any suitable size desired.

Having thus described my invention, what I claim as new is—

1. An improved horse-collar provided at the ends of its sides with connection-pieces C and D, the connection D being provided with a socket $g$ and a hook E, and the connection C being provided with a projection G to enter socket $g$ and with a bearing F for engagement by the hook E, all substantially as and for the purposes set forth.

2. In a horse-collar, the combination of the connection-piece C, provided with a bearing F, the connection-piece D, and the fastening-bar pivoted to said piece D and provided with a hook E and side lugs $e$, substantially as set forth.

3. In a horse-collar, the combination of the connection-piece D, having a socket $g$, and connection-piece C, having a bearing F and a projection G to enter the socket $g$, the fastening-bar pivoted to the piece D and having a hook E, side lugs $e$, and handle H', and the spring-catch I, all substantially as and for the purposes set forth.

4. In a horse-collar, the combination of the side pieces A, the hames, the cap-piece, and the bolts hinged at their inner ends to the cap-piece, extended thence outward through the hames and secured, all substantially as and for the purposes set forth.

SILAS T. MARLETTE.

Witnesses:
W. D. HOUGH,
C. E. CROMLEY.